Nov. 12, 1957     A. G. MASINDA     2,812,580
LOCATOR PIN
Filed Aug. 18, 1955
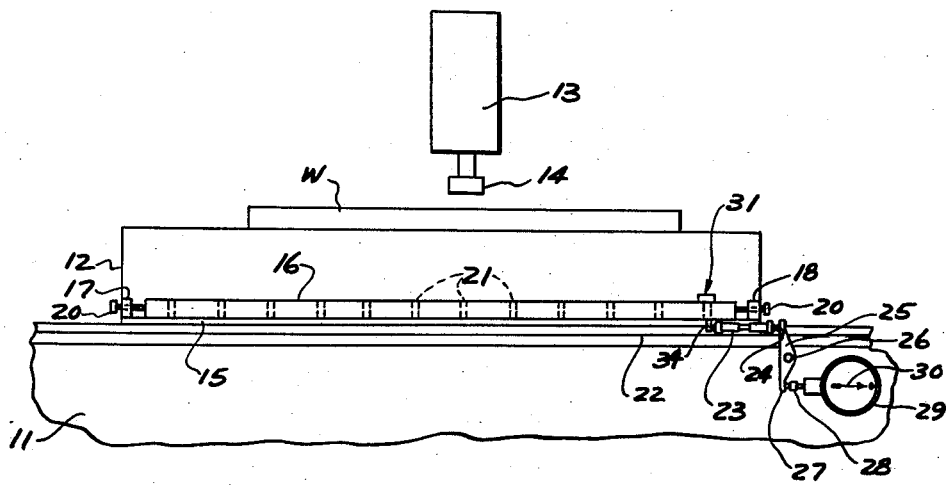
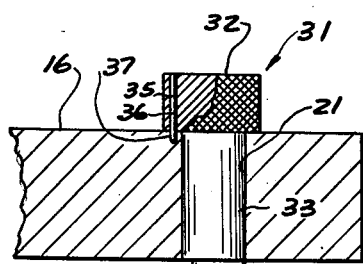
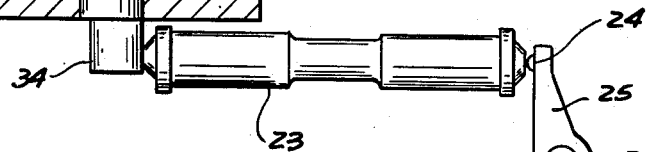
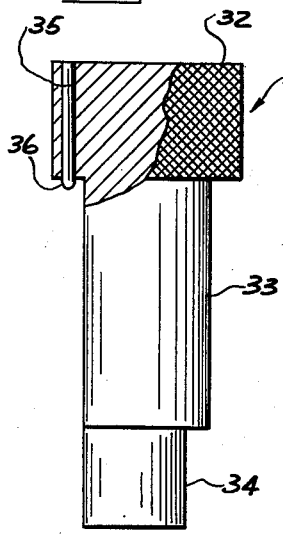
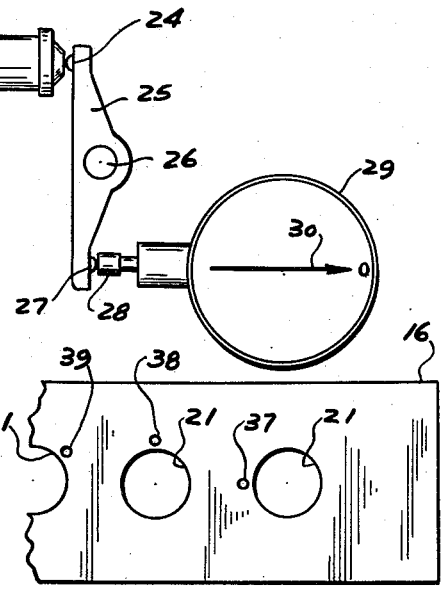
INVENTOR.
ALBERT GEORGE MASINDA
BY
*Robert A. Sloman*
ATTORNEY

United States Patent Office 2,812,580
Patented Nov. 12, 1957

2,812,580

LOCATOR PIN

Albert George Masinda, Detroit, Mich.

Application August 18, 1955, Serial No. 529,199

5 Claims. (Cl. 33—125)

This invention relates to locator pins and more particularly to their use in combination with a measuring bar upon a machine tool for providing an automatic locating means between a movable portion of the machine and a stationary portion of the machine.

Heretofore locator bars have been employed upon the carriage, for example, of a machine tool, which bars have a series of longitudinally spaced transverse apertures therethrough in predetermined spaced relation depending upon the particular machining operation for a particular job. Locater pins have heretofore been employed in conjunction with such bar. However, it has often been found difficult to accurately locate the transverse openings in the bar for eliminating errors. This consequently results in a slight error in the final spacing or location of the particular machining with respect to the workpiece such as the drilling of a hole therethrough.

It is the primary object of the present invention to provide a locator pin construction which will correct this error and will eliminate error.

It is the further object of the present invention to provide in a measuring bar construction of this type a novel form of locator pin which is rotatable within the transverse openings formed through the bar and which carries upon a portion thereof a cam or eccentric element which may be rotated with respect to said bar and which may be secured in the finally rotated position to thereby accurately set the spacing of the cam surface with respect to an indicator, or with respect to a measuring block or blocks or a micrometer which may be interposed between the measuring edge of the locator pin and the gaging mechanism.

It is the still further object of the present invention to employ in conjunction with such measuring bar the present locator pin which may be removably positioned within each of the openings formed through the bar and one by one with respect to the particular opening may be rotated until an accurate spacing is obtained, after which a portion of the bar adjacent its aperture will be bored or cut so as to receive a portion of a removable locking pin for securing the particular locator pin in the correct position and for further assuring that upon removal of the said locator pin and its subsequent replacement, the locking element or pin will correctly register again with the predetermined location as set.

These and other objects will be seen from the following specification and claims in conjunction with the appended drawing in which:

Fig. 1 is a front elevational and partially diagrammatic view of a machine tool, incorporating the present locator pin and bar and the gaging mechanism employed.

Fig. 2 is a fragmentary elevational view partially sectioned illustrating one of said locator pins and a portion of the measuring bar in conjunction with a micrometer and a gage element, shown on an enlarged scale.

Fig. 3 is a side elevational view of the locator pin shown in Fig. 2 on an enlarged scale, partially broken away and sectioned.

Fig. 4 is a bottom plan view of the locator pin of Fig. 3; and

Fig. 5 is a fragmentary plan view of a portion of the measuring bar shown in Figs. 1 and 2.

It will be understood that the above drawing illustrates merely a preferred emobdiment of the invention and that other embodiments are contemplated within the scope of the claims hereafter set forth.

Referring to Fig. 1, the present machine tool includes a stationary element or base 11, upon which is provided in a conventional manner a longitudinally reciprocal carriage 12 upon which is mounted and secured workpiece W with respect to an overlying spindle 13 which forms a part of the machine and which has a depending tool 14 whose longitudinal axis in a conventional manner is arranged at right angles to the direction of adjustment of carriage 12.

Carriage 12 in the preferred embodiment has a longitudinal ledge or support 15 forming a part thereof upon which is positioned the measuring bar 16 and which has formed transversely therethrough a series of circular slots 21, and which are formed in a predetermined spaced relation with respect to each other.

Opposed projections 17 and 18 on carriage 12 are arranged adjacent opposite ends of measuring bar 16 and have longitudinally threaded therethrough in opposed relation the axially aligned adjusting bolts 20. These bolts threadedly engage the projections 17 and 18 and are adapted to operatively engage the opposite end wall portions of the measuring bar 16 in order to provide a predetermined yet adjustable location of said bar upon and with respect to carriage 12.

There is also provided upon the bed 11 of the machine a horizontally disposed trough or ledge 22 within which may be positioned a measuring block or, for illustration, the micrometer 23, and which is adapted to rest in a horizontal position as shown.

There is incorporated as a portion of the machine a gaging element which includes the lever 25 pivotally mounted at 26 upon bed 11 and which at one end as at 24 engages the right end of micrometer 23. The opposite end of said micrometer is adapted to operatively be engaged by the lower cam and 34 of the locator pin 31 carried by measuring bar 16 as the carriage 12 in manually or otherwise fed with respect to the bed 11 for locating the workpiece W with respect to the tool 14.

The lower end of the lever as at 27 is adapted to operatively engage the reciprocal spindle 28 on the dial indicator 29 whose pointer 30 is adapted to register zero at the moment that the locator pin 31 operatively engages the micrometer 23 to indicate that for the particular positioning of the locator pin 31 the cutting tool 14 will be in correct registry with the workpiece in accordance with a predetermined pattern or blue print which has determined in advance the exact location of the openings or other machining to be done in the workpiece.

The locator pin 31, in conjunction with the measuring bar 16, is more particularly illustrated on an enlarged scale with respect to Figs. 2, 3 and 4.

As shown in Fig. 2, the locator pin 31 includes the knurled head 32 upon one end of the cylindrical shank 33 which forms a part of the pin and which is of reduced diameter with respect to the head 32. The shank 33 is slidably and snugly positioned within the transverse aperture 21 formed in the measuring bar 16 and there is a close fit with respect thereto.

The shank 33 terminates below bar 16 in an eccentric cylindrical extension 34, which is adapted to engage upon one upright side thereof, one end of micrometer 23. In Fig. 4, numeral 40 indicates the extent of the offset of the center line of the eccentric portion 34 with respect to the center line of the shank 33. This offset is slightly larger than one-half of the greatest error in any two adjacent holes in the measuring bar.

Accordingly, though great effort is usually made in effecting an accurate spacing of the holes 21 in bar 16, almost always there will be some slight error in the spacing which will preclude a completely accurate predetermined location of the workpiece with respect to the cutting tool. Accordingly, it is contemplated as a part of the present invention that the locator pin 31 may be manually rotated so that the eccentric portion 34 thereof will be in effect be laterally translated so as to operatively engage micrometer 23, whose opposite end is in contact with the measuring gage, including the dial indicator, or other measuring gage mechanism. Consequently, the locator pin 31 may be rotated until the exact correction has been made in the measurement, after which the said locator pin may be locked in this position of rotation.

For this purpose there is provided in the head 32 upon the outside of the cylindrical shank 33 the longitudinal hole 35 within which is slidably positioned and secured the upright lock pin 36, whose lower end projects below head 32.

Once the locator pin has been rotated to the desired position, and with the lock pin 36 removed, there will be formed within the top surface of the measuring bar 16 an indent hole such as the indent hole 37 shown in Fig. 5 as by machining or drilling. This indent hole will then cooperatively receive the projecting end of lock pin 36 once the same is inserted through the slot 35 in the head of the locating pin.

This means that after the locating pin 31 is removed from the particular slot 21 and transferred to a different slot, such as in accomplishing the second machining operation of a particular workpiece, or other machining operations; that if the pin 31 is replaced in the initial opening 21, it may again be rotated manually until the lock pin 36 again registers with and projects into the indent hole 37 and which will thus assure that the locating pin 31 has again arrived at the same position of rotated adjustment, which was originally determined with respect to the cam surface 34.

In the construction of the measuring bar 16 it is therefore a part of the present invention that the said locating pin 31 will be introduced one at a time into the respective predetermined holes 21 and in each case manually rotated until the cam surface 34 thereon, in registry with a micrometer or other gage block and in conjunction with the gaging mechanism, has achieved the correct accurate spacing for the next machining operation. In such new position a new indent hole 38, for illustration, will be machined into the top surface measuring bar 16 and which will cooperatively and retainingly receive the projecting end of lock pin 36.

And so on, the same thing will be done with all of the predetermined measuring openings 21, such as the formation of the next indent hole 39 shown in Fig. 5 until there is a particular indent hole in the measuring bar corresponding to each transverse slot 21.

It is contemplated that naturally each of the indent holes 37, 38 and 39, will have a different angular positioning with respect to a particular transverse slot 21. This will assure, however, that upon introduction of the same locating pin within any of the said holes 21, that upon registry of a lock pin 36 with a particular indent hole, it will be ascertained that the locating pin and its cam surface 34 has been rotated to the correct measuring position.

By this construction it is possible to accurately machine a plurality of identical workpieces, one at a time, and by employing the present locator pin in conjunction with the gaging mechanism know that without further measurement, just as soon as the indicator 29 registers zero with respect to a particular location, then in that case the same predetermined relationship between the cutting tool 14 and the particular workpiece will be established for all workpieces without re-measuring or re-locating the machine slide with respect to the bed 11.

It is contemplated as a part of the present invention that the parts be reversed to the extent that the measuring mechanism may be mounted upon the movable part of the machine, whereas the measuring bar may be mounted upon the stationary portion of the machine.

In the preferred embodiment of the invention the apertures 21, i. e. the spacing of the apertures 21 corresponds to the desired machining operation, which, of course, is predetermined by the blue print or other plan for machining of the workpiece. On the other hand, employing a measuring bar such as shown in Fig. 1, it is possible to establish a predetermined spacing between the respective apertures 21 and to accurately set the location of the locator pin 31, so as to eliminate all error in the location of the openings 21 in the measuring bar.

In the machine measurements system hereinabove described, hole increment spacing is obtained through the registry of the side of the pin to the indicator. Decimal increments are obtained by adjustment of the micrometer.

This method of measurement may also be used without micrometers when hole spacings in the measuring bar are bored to dimensions required by one certain job. In this case the pin registers directly against the indicator.

In modern shop practice, the spacing of holes in a measuring bar of this type to extremely fine tolerances is oftentimes hard to do, and in all cases very costly. The present invention thus contemplates a locator pin which has been devised to correct or compensate for such errors in hole spacings, thus making it possible to produce measuring bars of this nature with great ease and at minimum cost. Such bars provide a very effective means of obtaining fast and relatively accurate machine movements.

Having described my invention, reference should now be had to the claims which follow for determining the scope thereof:

I claim:

1. In combination an elongated measuring bar adapted for positioning upon one of two relatively movable parts of a machine tool, said bar having formed therethrough a series of cylindrical apertures in predetermined longitudinally spaced relation, and a locator pin selectively positionable within any of such apertures and extending therefrom adapted for engagement with an indicating means mounted upon the other of said relatively movable parts, said locator pin consisting of a cylindrical body, an enlarged head on one end of the body supportably registering with the measuring bar, and an eccentric cylindrical element depending from the other end of the body and positioned beyond the measuring bar, there being separate indent holes in the surface of the bar, one spaced from each aperture in a predetermined angular relation about the axis of the aperture, and all holes at the same radial distance from said apertures, and a lock pin depending from said head parallel to its longitudinal axis and registerable with the detent hole of any selected aperture.

2. In combination an elongated measuring bar, said bar having formed therethrough a series of cylindrical apertures in predetermined longitudinally spaced relation, and a locator pin selectively positionable within any of such apertures and extending therefrom, said locator pin consisting of a cylindrical body, an enlarged head on one end of the body supportably registering with the measuring bar, and an eccentric cylndrical element depending from the other end of the body and positioned beyond the measuring bar, there being separate indent holes in the surface of the bar, one spaced from each aperture in a predetermined angular relation about the axis of the aperture, and all holes at the same radial distance from said apertures, and a lock pin depending from said head parallel to its longitudinal axis and registerable with the detent hole of any selected aperture.

3. The combination of claim 1, said eccentric cylindrical element lying within the diameter of said body and having a longitudinal axis parallel to the body axis.

4. The combination of claim 1, there being a longitudinal hole in said head removably receiving said lock pin, said hole being parallel to the pin axis at a radius equal to the radial location of said indent holes with respect to the axes of said apertures.

5. A locator pin comprising a cylindrical body, an enlarged head on one end of the body, an eccentric cylindrical element depending from the other end of the body, lying within the diameter thereof and with its axis parallel to the body axis, and a lock pin joined to and depending from said head parallel to the longitudinal axis of the body and spaced laterally outward therefrom, there being a longitudinal hole extending through said head removeably receiving said lock pin.

References Cited in the file of this patent

UNITED STATES PATENTS

| | | |
|---|---|---|
| 1,526,305 | Neumaier | Feb. 10, 1925 |
| 2,336,767 | Ash | Dec. 14, 1943 |
| 2,458,344 | Carroll | Jan. 4, 1949 |
| 2,474,656 | Claus | June 28, 1949 |
| 2,508,837 | Peffers | May 23, 1950 |
| 2,524,256 | Creany | Oct. 3, 1950 |